United States Patent Office 3,317,064
Patented May 2, 1967

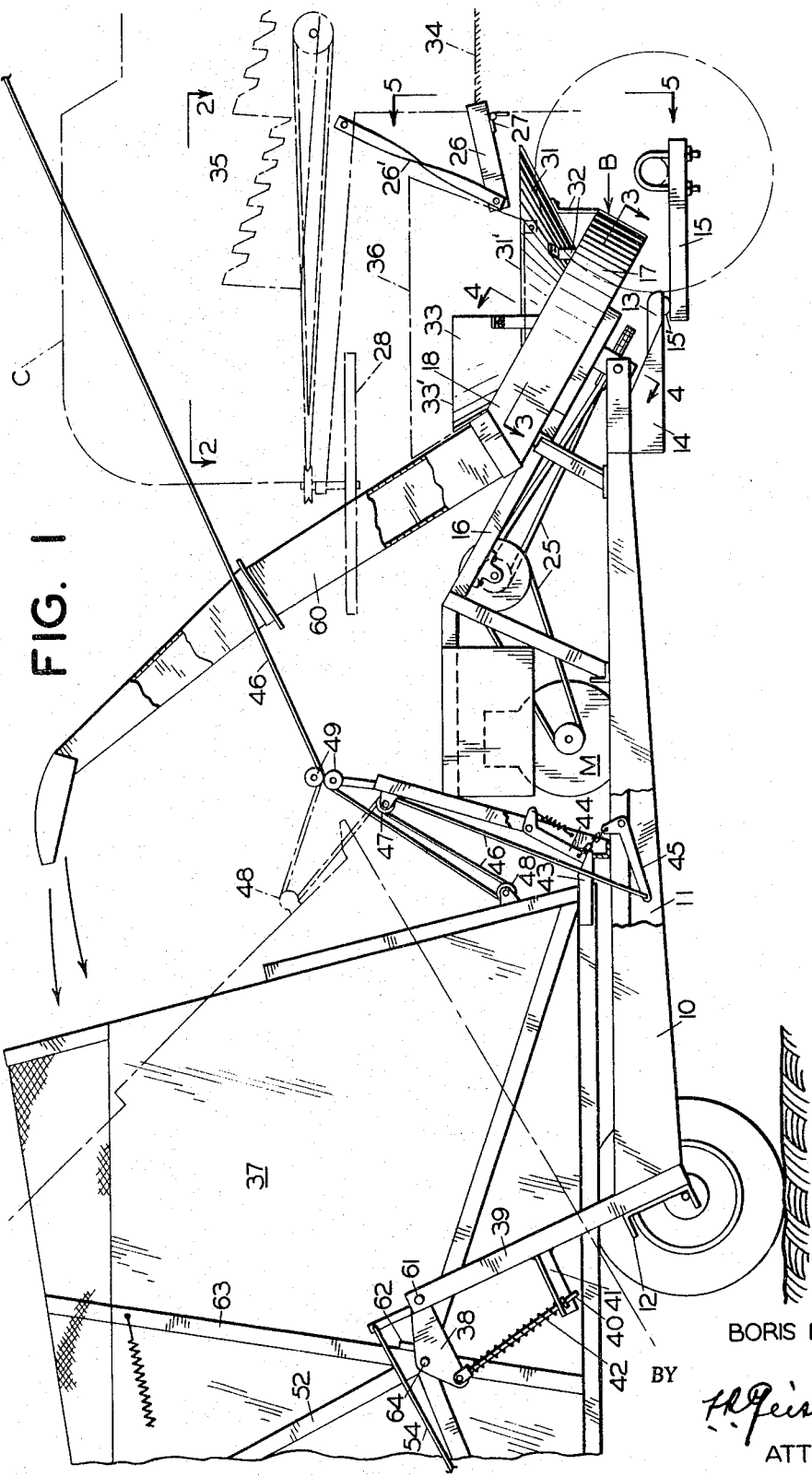

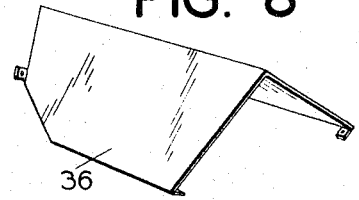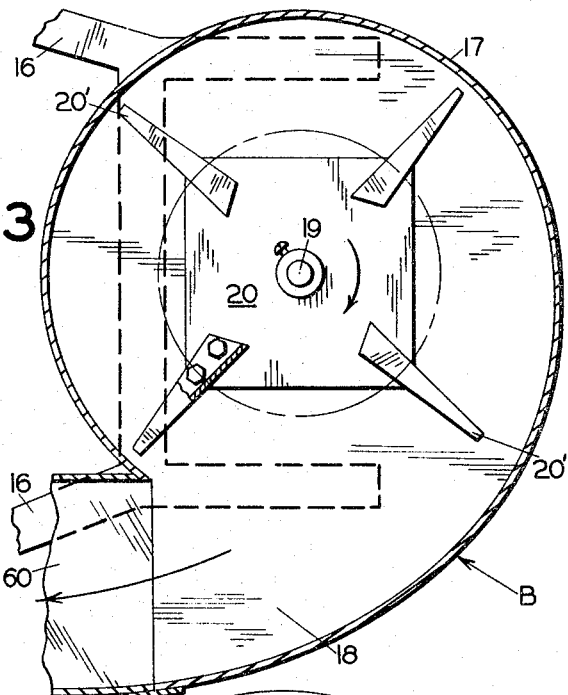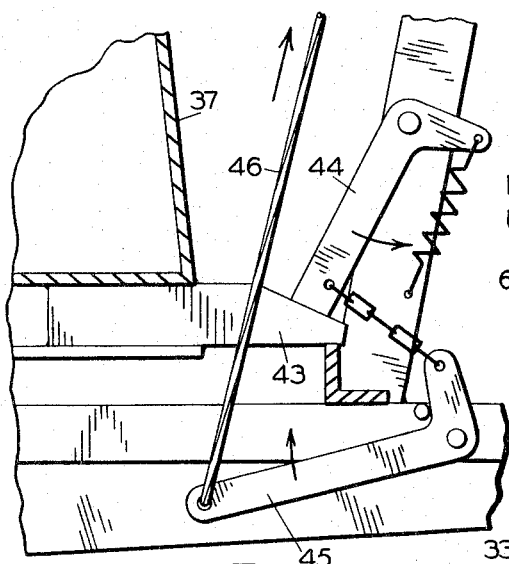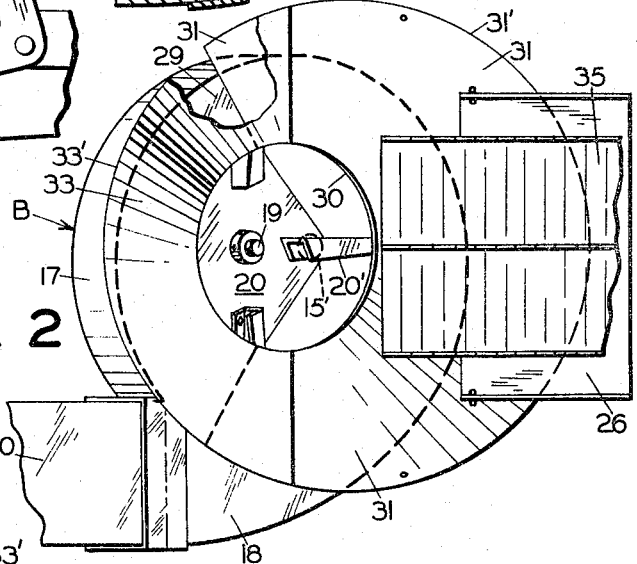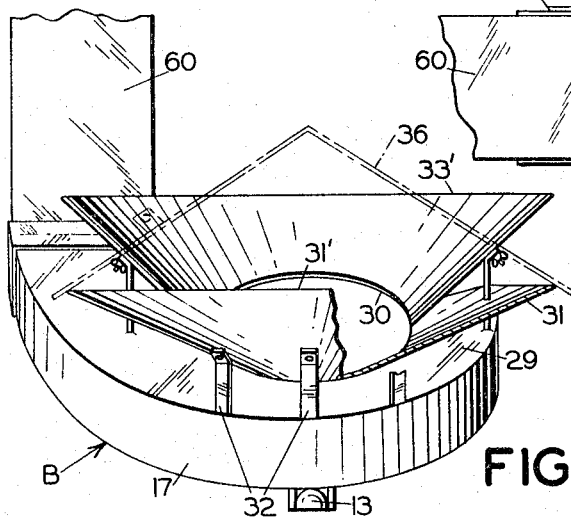

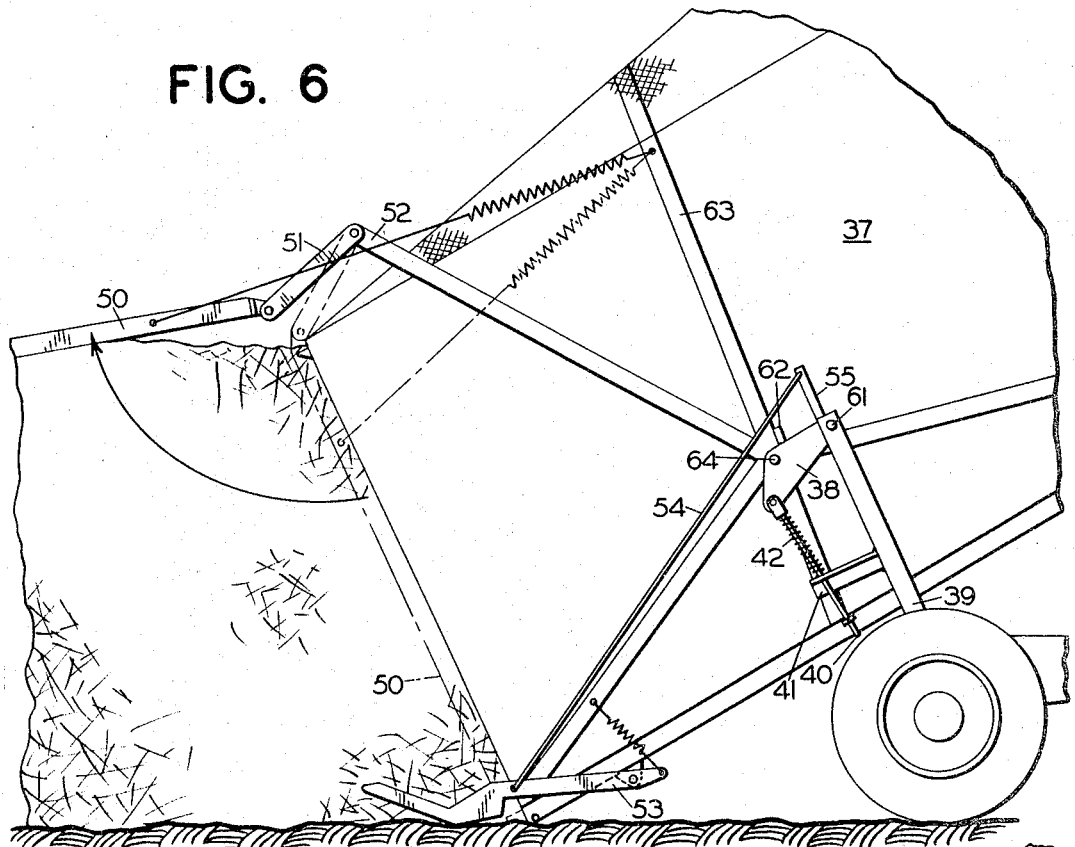
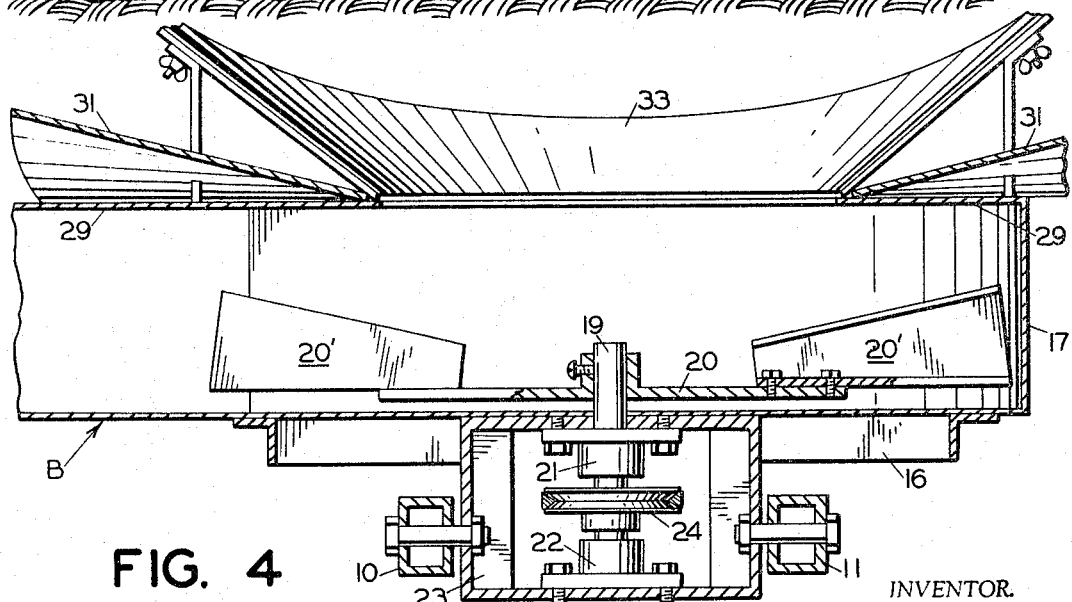

3,317,064
SELF-CONTAINED FORAGE WAGON ASSEMBLY FOR HARVESTER COMBINE
Boris M. Fingerut, Lake Grove, Oreg., assignor to Portland Wire & Iron Works, Portland, Oreg., a corporation of Oregon
Filed Aug. 24, 1964, Ser. No. 391,447
6 Claims. (Cl. 214—42)

This invention relates in general to harvester combines, and, more specifically, to means for collecting the chaff, or the chaff and straw, as such material is discharged from the harvester combine.

The threshing of the grain in a harvester combine produces a residue of chaff and straw. The straw is separated out from such residue to a considerable extent and the chaff and straw are discharged separately. Since the chaff has considerable food value for cattle, while the straw has little or none, it is customary to collect the chaff as it leaves the harvester combine while often allowing the straw to pass out onto the ground. On the other hand, it is sometimes desirable to collect straw with the chaff since the straw provides bulk material in fodder.

A customary means for collecting the chaff from a harvester combine is to provide a transversely extending trough in the rear portion of the harvester into which the chaff drops, and to arrange a blower at one end of the trough and a screw conveyor in the trough for removing material in the trough along to the blower, the blower and screw conveyor being driven by a take-off from the power plant on the combine. Then a long spout, connected with the blower, leads upwardly and rearwardly from the harvester combine and discharges into a trailer wagon which is towed by the harvester combine.

Various problems are involved in providing and installing such means on a harvester combine for collecting the chaff, or for collecting chaff and straw when special provision is made for collecting the straw along with the chaff. Since heretofore it has been necessary to build such means into the harvester combine, and since there are variances in construction with different makes or harvester combines, such means have had to be constructed individually and arranged to conform to the requirements of the particular harvester combine. Consequently this involves considerable labor and expense in each individual case. Also, since the trailer wagon or chaff wagon, into which the spout from the blower on the harvester combine discharges, will be moved out of alignment with the harvester combine whenever the harvester combine turns to one side or the other, the spout from the blower must be capable of being directed so that it will always discharge into the bin on the wagon which is being towed instead of discharging to one side or the other when the combine and wagon are not in horizontal alignment.

The object of the present invention is to provide a trailer or forage wagon for harvester combines which, in addition to carrying the receiving bin for the chaff, or chaff and straw, as produced by the harvester combine, will also provide means for collecting such material and depositing it in the bin on the wagon; in other words, the object of this invention is to provide a novel forage wagon or trailer for harvester combines which will comprise a completely self-contained assembly in which will be included means taking the place of the collecting means which heretofore had to be specially installed in the harvester combine and operated from the power plant on the harvester combine.

A related object of the invention is to provide a self-contained forage wagon which can be used with any modern or conventional type of harvester combine, requiring no change or installation to be made in the harvester combine other than the mounting of special simple trailer hitch means on the harvester combine for the wagon and possibly an extension on the chaff discharge pan on the harvester.

Another object is to provide a novel self-contained forage wagon which will not only contain the means for collecting the forage material desired from the harvester combine but will provide its own power for operating such collecting means, so that no take-off from the power plant on the harvester combine will be required.

A further object of the invention is to provide a self-contained forage wagon which can quickly and easily be connected up with any harvester combine of modern or conventional type and then quickly and easily disconnected therefrom.

An additional special object of the invention is to provide an improved forage wagon or trailer having self-contained means for collecting the desired material from the harvester combine to which it is attached and for depositing the collected material in the bin on the wagon, which will collect and deposit the material as desired, regardless of whether the wagon is being towed by the harvester combine in a straight path or whether the vehicles become temporarily turned with respect to each other.

Another object is to provide a trailer assembly for collecting forage material from a harvester combine which will enable the straw to be included in or excluded from the collected material.

The manner in which these objects and other incidental advantages are attained with the self-contained forage wagon of the present invention and the construction and manner of operation of the entire device, will be readily understood from the following description and explanation with reference to the accompanying drawings.

In the drawings:

FIG. 1 is a side elevation of the forage wagon assembly with the near side wheel removed and a portion of the assembly frame being broken away for clarity, the assembly being shown in operating position behind a harvester combine, the rear portion of the harvester combine being indicated by broken lines and the hood, used when it is desired to have the straw discarded onto the ground, also being indicated by broken lines; the bin on the forage wagon being shown in full lines in normal receiving position and in broken lines in dumping position;

FIG. 2 is a fragmentary plan view taken on lines indicated at 2—2 of FIG. 1, drawn to a larger scale;

FIG. 3 is a fragmentary section on line 3—3 of FIG. 1, drawn to a still larger scale;

FIG. 4 is a fragmentary section on line 4—4 of FIG. 1 but drawn to a much larger scale.

FIG. 5 is a fragmentary elevation taken on line 5—5 of FIG. 1 drawn to the same scale as FIG. 2, with portion of one of the receiving funnels broken away and shown in section for clarity;

FIG. 6 is a fragmentary elevation of the rear portion of the bin in the forage wagon assembly, showing the same in dumping position drawn to the same scale as FIG. 1, with the near side wheel removed;

FIG. 7 is a fragmentary sectional elevation drawn to a larger scale showing more clearly the control latch for holding the bin loading position on the wagon assembly; and FIG. 8 is a perspective view of the removable cover for the straw guiding funnel drawn to a slightly smaller scale than FIG. 1, showing one form or shape in which the cover may be made.

Referring first to FIG. 1, the assembly has a rigid, substantially horizontally extending, main frame of triangular or A frame shape including side frame members 10 and 11 converging towards the forward end of the frame and a transverse rear main frame member 12 to which is secured the axle for the two wheels, which wheels constitute the running gear for the wagon assembly. A hitch member 13 is rigidly secured to the front end of the main frame by a pair of plates, one of which is shown at 14. The hitch member 13 contains a socket for a ball mounted on the end of a companion hitch member 15 which is rigidly clamped to the rear axle of the harvester combine with which the forage wagon assembly is to be used. The location of the ball and socket hitch joint by which the assembly is connected with the harvester combine is an important feature as later explained.

A blower, indicated in general by the reference character B, is mounted on an open frame 16 which is secured on the main frame in the location shown in FIG. 1. This blower includes a main housing having a side wall 17 which is cylindrical except at one side where the wall forms part of a discharge passageway 18 (see also FIG. 3) for connection with the spout assembly 60, which latter leads upwardly and rearwardly. The bottom of the blower housing, instead of extending in a horizontal plane, extends in an inclined plane, inclined preferably at an angle of approximately 30° with the horizontal. The shaft for the impeller in the blower consequently extends at an angle of approximately 60° with the horizontal. Having the blower housing assembly mounted on an inclined plane in this manner reduces the amount of direction change imposed on the material moving into the spout assembly 60 from the passageway 18 in the blower. Also this arrangement of the blower assembly facilitates the guiding of the material into the blower as the material is discharged from the harvester combine.

The shaft 19 (FIG. 4) for the impeller in the blower B is rotatably mounted in bearings 21 and 22 in a lower frame 23 on the bottom of the housing which in turn is secured between the front ends of the main frame side members 10 and 11. A pulley 24, secured on the shaft 19, is connected by a suitable belt system 25 (FIG. 1) with an internal combustion motor M carried on the main frame of the wagon assembly. The impeller for the blower B comprises a plate 20 (FIG. 4) secured on the shaft 19 which carries suitable blades 20′.

A top plate 29 (FIGS. 4 and 5) is mounted on the top of the housing wall 17, and has a circular central opening providing the passageway 30 into the blower. A lower, partially funnel-shaped guideway 31 (FIGS. 1, 2 and 5), hereinafter referred to as the chaff funnel, has its smaller inside rim extending around the lower half of the passageway 30. The outer and larger rim portion 31′ of this guideway extends in a horizontal plane. This guidway is secured to brackets 32 extending upwardly from the top of the blower housing.

An upper companion partially funnel-shaped guideway 33 (FIGS. 1, 2, 4, and 5), hereinafter referred to as the straw funnel, extends around the upper half of the top of the housing and completes the guideway leading to the blower assembly. The top rim of this upper guideway or straw funnel 33′ also extends in a horizontal plane but, as apparent from FIG. 1, at a higher elevation than the rim of the lower chaff funnel 31′.

In the most modern conventional harvester combines it is customary to have the transfer discharge pan for the chaff at the rear of the harvester combine located at a lower level than the discharging "walker" for the straw, and also to have such discharging "walker" for the straw terminating further rearwardly than the chaff discharge pan. In FIG. 1 the chaff discharge pan for the harvester combine C is indicated by the broken line 34 and the discharging "walker" for the straw is indicated by the broken line 35. The end portions of these discharging elements, and their relative positions with respect to the blower assembly and funnel guideways are also shown in full lines in FIG. 2. To aid in conducting the chaff from the chaff discharge pan 34 into the chaff funnel 31 and passageway 30 into the blower an extension 26 (FIGS. 1 and 2) is attached on the end of the chaff discharge pan 34 by suitable connecting means 27 and the outer or rear end of this extension 26 is supported by a reinforced rubber strap 26′ or other suitable suspension means attached to the combine.

As apparent from these figures, the chaff discharged from the pan 34 will be delivered mainly into the chaff funnel 31 and into the opening 30 leading to the blower, while the straw discharged from the "walker" 35 will be directed to the upper straw funnel 33 and thence through the passageway 30 into the blower.

From FIG. 2 it will be noted that the diameters of the upper peripheral edges of the two guideways or funnels 33 and 31 considerably exceed the width of the chaff discharge pan 34 and the discharging straw "walker" 35, and that these guides and the entire blower assembly are positioned along the same longitudinal center line. Furthermore it will be noted that the ball and socket pivotal hitch connection between the wagon assembly and the harvester combine (indicated by the ball 15′ shown in broken lines in FIG. 2 and also shown in FIG. 1), is substantially in vertical alignment with the center of the funnels and of the passageway 30 into the blower. Consequently when the wagon assembly is hitched to the harvester combine the turning of the harvester combine with respect to the wagon assembly will result in the discharging ends of the chaff pan 34 and its extension 26 and the straw "walker" 35 swinging about an axis substantially in vertical alignment with the ball and socket hitch joint. In other words, when the harvester combine and the hitched wagon assembly move out of alignment with each other, the discharging ends of the chaff pan, extension 26 and of the straw "walker" will continue to be above the area defined by the top peripheral edges of the chaff and straw guides or funnels 31 and 33. Consequently the movement of the connected vehicles out of alignment with each other will in no way prevent the discharging of the chaff, and, if desired, also the discharging of the straw, into the blower and the material received by the blower will then be delivered from the blower through the spout assembly 60 and discharged into the bin 37 on the wagon without requiring the spout assembly to be moved to one side or the other. This is an important feature of the invention.

The upper guideway or straw funnel 33 is so mounted on the top of the blower housing that it can be quickly and easily removed, and, in the event it is desired to collect the chaff alone, without the straw, in the bin of the wagon assembly, the straw funnel 33 is removed and a simple removable hood or cover is used to replace the straw funnel. Such cover may either consist of a flat pan or sheet or may preferably be of the shape shown by the broken lines 36 in FIGS. 1 and 5 and shown by itself in perspective in FIG. 8, having the top face sloping downwardly on both sides from a longitudinally extending center ridge and set in position as shown in broken lines in FIG. 1. The front of the hood 36 is open and the hood, when set in place extends forward sufficiently to prevent the straw from passing into the blower. It is customary in conventional combines to have a rotating straw spreader mounted below and to the rear of the end of the straw "walker," and to have the same driven by a belt connection from a power take-off on the combine. Such a spreader is indicated by the broken lines 28 in FIG. 1. When it is desired to have only the chaff delivered into the blower the straw spreader 28 is relocated to the left hand corner of the hood of the combine, so as to provide increased clearance between the spreader and the blower spout assembly 60, and is connected up, the hood 36 having been set in place and the straw funnel 33 having been removed. When this is done the hood 36, whether in the ridged shape shown, or whether made entirely flat, together with the straw spreader 28, will cause all the straw to be scattered on the ground. However the hood 36 will not interfere with the depositing of the chaff into the lower funnel 31 and into the blower.

The bin 37 (FIGS. 1 and 6) on the wagon assembly is pivotally mounted on opposite sides on pivot pins 64 on a pair of arms 38 respectively one of which pivot pins and one of which arms are shown in these figures. Each of the arms 38 is in turn pivotally mounted at 61 on an upright bar 39 rigidly secured at its lower end to the main frame as shown. A stop 62, secured on a frame member 63 of the bin on each side limits the extent to which the angle between the arm 38 and frame member 63 can be reduced.

A pair of slide rods 40, one of which is shown in the figures, having their upper ends pivoted to the arms 38 respectively, are slidable through bracket arms 41 rigidly secured on the bars 39, and a spring 42 is mounted on each slide rod 40 and held under compression. A latch bar 43 (FIGS. 1 and 7) at the center of the lower front end of the bin engages a spring controlled latch 44 pivotally mounted on a rigid upright member.

When the bin 37 is in horizontal or normal riding position and with the latch bar 43 locked by the latch 44, the weight of the bin 37, whether empty or loaded, will be carried by the pivot pins 64, pivot mountings 61 for the arms 38 and stops 62, on opposite sides respectively, with very little load on the springs 42. Moreover the pivot pins 64 are located slightly rearwardly of the transverse line of the center of gravity of the bin 37 when the bin is empty, and the weight of the bin when empty is not sufficient to compress the springs 42. Consequently the bin, when empty, will always tend to return to normal horizontal position and cause the latch bar 43 to become locked by the latch 44.

The bin 37 is wider at the rear than at the front and when the bin becomes loaded the transverse line of the center of gravity of the bin becomes moved slightly rearwardly of the pivot pins 64. When the loaded bin is unlatched by releasing the latch 44, the bin, together with the arms 38, pivots on the pivot mountings 61 while the springs 42 are allowed to compress. As the bin unloads the lightening of the load allows the springs 42 to expand and the arms 38 to move up again, while the bin remains in the dumping position shown in FIG. 6. Then, when the bin has emptied, the bin pivots on the pivot pins 64 and returns to normal horizontal position.

The manner in which the latch 44 is released is shown in FIGS. 1 and 7. A bell-crank lever 45 has one end connected with the lower end of the latch 44. A cable 46, connected to the other end of the bell-crank lever 45, passes around a first pulley 47 (FIG. 1) mounted on the same rigid upright support member as the latch 44, next passes around a pulley 48 mounted on the lower end of the front wall of the bin 37, and thence passes between guide pulleys 49 and extends forwardly to the cab of the harvester combine. Thus, the operator of the harvester combine, by pulling on the cable 46, can release the latch 44, and, if ahe loaded bin for any reason should not tip back of its own accord, continued pull on the cable 46 will cause it to do so.

The rear wall or tail gate 50 (FIG. 6) for the bin 37 is mounted on a special hinge assembly consisting on each side of a hinge arm 51 pivotally supported at its forward end on a bar 52 firmly mounted on the bin and the hinge arm is pivoted at the other end to the top of the wall 50. Thus when the rear wall is swung out to open position by the pressure of the material against the rear wall, the top of the rear wall will also be spaced out from the bin so as to not interfere with the rapid dumping of the entire bin contents.

A rear wall latch 53 is mounted at the lower rear portion on each side of the bin to engage a short latch bar extending from each side of the rear wall. A cable 54 connects each latch 53 to a stationary finger 55 secured on the stationary upright bar 39. As apparent from FIG. 6, the tilting of the bin 37 into dumping position automatically causes the cable 54 to be pulled so as to raise the latch to unlocking position and enable the rear wall 50 to swing out freely.

I claim:

1. In a self-contained forage wagon of the character described adapted for use with a harvester combine having rearwardly extending chaff-discharging means and straw-discharging means, a hitch on the wagon for connecting said wagon to the harvester combine, a blower assembly entirely supported on said wagon and centrally positioned at the front end of said wagon, a housing for said blower assembly, a top wall on said housing, an impeller in said housing, a motor on said wagon operating said impeller, said top wall of said housing having a central entrance opening into said blower assembly interior, upwardly outwardly expanding guide means on said housing extending from said entrance opening, said blower assembly and said guide means so located on said wagon that said blower housing and said guide means will be above said hitch and below the ends of the chaff-discharging means and straw-discharging means on the harvester combine when said wagon is hitched to the harvester combine, an upwardly rearwardly extending chute entirely supported on said wagon and connected with said housing, and a forage bin on the rear portion of said wagon for receiving material discharged from said chute.

2. A self-contained forage wagon adapted for use with a harvester combine of the character described having rearwardly extending chaff-discharging means and straw-discharging means, said wagon including a main frame having a pair of main side members converging towards the front end of the wagon, hitch means for connecting said wagon to the harvester combine, a swivel joint in said hitch means, a blower assembly entirely mounted on said wagon and positioned at the front end of said main frame, a housing for said blower assembly the bottom wall of said housing inclined upwardly and rearwardly, a top wall on said housing, an impeller in said housing, a motor on said wagon operating said impeller, said top wall of said housing having a central entrance opening into said blower assembly interior, upwardly outwardly expanding guide means on said housing extending from said entrance opening, said blower assembly and said guide means so located on said wagon that the center of said entrance opening into said blower housing and said guide means will be approximately in vertical alignment with said swivel joint in said hitch means and below the ends of the chaff-discharging means and straw-discharging means on the harvester combine when said wagon is hitched to the harvester combine, an upwardly rearwardly extending chute entirely supported on said wagon and connected with said housing, and a forage bin mounted on the rear portion of said wagon for receiving the material discharged from said chute.

3. In a forage wagon adapted for use with a harvester combine of the character described, a main frame having a pair of main side members converging towards the front end of the wagon, hitch means for connecting said wagon to the harvester combine, a swivel joint in said hitch means, a blower assembly positioned at the front end of said main frame, a housing for said blower assembly, said housing mounted in upwardly rearwardly inclined position, an impeller in said housing, a motor on said wagon operating said impeller, the top of said housing having an entrance opening into said blower assembly interior, guide means on said housing leading to said entrance opening, said guide means including a lower partially funnel-shaped guide flange extending about the lower half of said entrance opening and an upper partially funnel-shaped guide flange extending about the upper half of said entrance opening, said guide flanges so arranged that when said wagon is hitched to the harvester combine said upper guide flange will be in position to be contacted by the straw discharged from the straw-discharging means on the harvester combine and said lower guide flange will be in position to be contacted by the chaff-discharged from the chaff-discharging means on the harvester combine, said blower assembly and said guide flanges so located on said wagon that the center of said entrance opening into said blower housing will be approximately in vertical alignment with said swivel joint in said hitch means, an upwardly rearwardly extending chute connected with said housing, and a forage bin on the rear portion of said wagon for receiving the material discharged from said chute.

4. The combination set forth in claim 3 with said guide flanges having a common substantially vertical axis and with the top edges of said guide flanges extending in a pair of substantially horizontal planes.

5. A self-contained forage wagon adapted for use with a harvester combine having rearwardly extending chaff-discharging means and straw-discharging means located above and extending rearwardly beyond the chaff-discharging means, said wagon including a main frame having a pair of main side members converging towards the front end of the wagon, hitch means for connecting said wagon to the harvester combine, a ball and socket joint in said hitch means, a blower assembly positioned at the front end of said main frame, a housing for said blower assembly, said housing mounted in upwardly rearwardly inclined position, an impeller in said housing, a motor on said wagon operating said impeller, the top of said housing having an entrance opening into said blower assembly interior, guide means on said housing leading to said entrance opening, said guide means including a lower upwardly outwardly expanding guide flange extending about the lower half of said entrance opening and an upper upwardly outwardly expanding guide flange extending about the upper half of said entrance opening, the top edges of said guide flanges extending in a pair of substantially horizontal planes, said guide flanges so arranged that when said wagon is hitched to the harvester combine said upper guide flange will be in position to be contacted by the straw discharged from the straw-discharging means on the harvester combine and said lower guide flange will be in position to be contacted by the chaff discharged from the chaff-discharging means on the harvester combine, said guide flanges having a common substantially vertical axis in substantially vertical alignment with said ball and socket joint, said upper guide flange so mounted as to be readily removable, a removable straw-deflecting cover mountable in place of said upper guide flange, an upwardly rearwardly extending chute connected with said housing, a forage bin hingedly mounted on the rear portion of said wagon for receiving material discharged from said chute, locking means for holding said bin in upright position on said wagon, and bin-releasing means operable from the harvester combine.

6. A self-contained forage wagon adapted for use with a harvester combine of the character described, said wagon comprising hitch means for connecting said wagon to the said harvester combine, said hitch means consisting of a pair of rigid members secured to said wagon and to the harvester combine respectively and connected by a swivel joint, a blower assembly centrally positioned at the front end of said wagon, a housing for said blower assembly, said housing mounted in upwardly rearwardly inclined position, an impeller in said housing, a motor on said wagon operating said impeller, the top of said housing having a substantially circular entrance opening into said blower assembly interior, guide means on said housing leading to said entrance opening, said guide means including a lower partially funnel-shaped guide flange extending about the lower half of said entrance opening, and an upper partially funnel-shaped guide flange extending about the upper half of said entrance opening, said guide flanges so arranged that when said wagon is hitched to the harvester combine said upper guide flange will be in position to be contacted by the straw discharged from the straw-discharging means on the harvester combine and said lower guide flange will be in position to be contacted by the chaff discharged from the chaff-discharging means on the harvester combine, the blower assembly so located on said wagon that the center of said entrance opening into said blower housing will be approximately in vertical alignment with said swivel joint in said hitch means, an upwardly rearwardly extending chute connected with said housing, a forage bin on the rear portion of said wagon for receiving the material discharged from said chute, a pair of spring-controlled support arms for said bin, hinge means for said bin on said arms, said hinge means so positioned and said bin so arranged that the transverse line of the center of gravity of said bin will be forward of said hinge means when said bin is empty and will be rearward of said hinge means when said bin is loaded, locking means for holding said bin in upright position on said wagon, and bin releasing means operable from the harvester combine for causing said bin to move to dumping position.

References Cited by the Examiner

UNITED STATES PATENTS

| | | | |
|---|---|---|---|
| 696,553 | 4/1902 | Dow | 302—6 |
| 954,365 | 4/1910 | Vraalstad | 302—6 |
| 2,608,310 | 8/1952 | De Penning | 214—42 |
| 3,092,272 | 6/1963 | Weigel | 56—476 X |

GERALD M. FORLENZA, *Primary Examiner.*

ROBERT G. SHERIDAN, *Examiner.*